Nov. 21, 1933.   T. D. HOWE, JR   1,936,088
GAUGE FOR CUTTING MACHINES
Filed Sept. 8, 1932   3 Sheets-Sheet 2
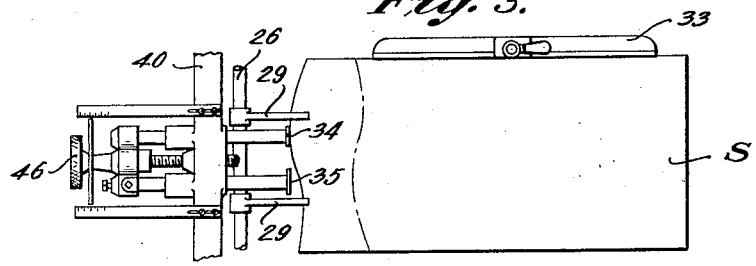
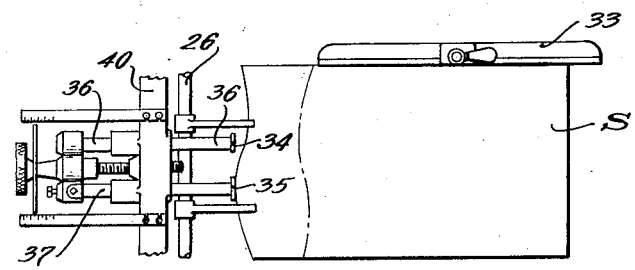
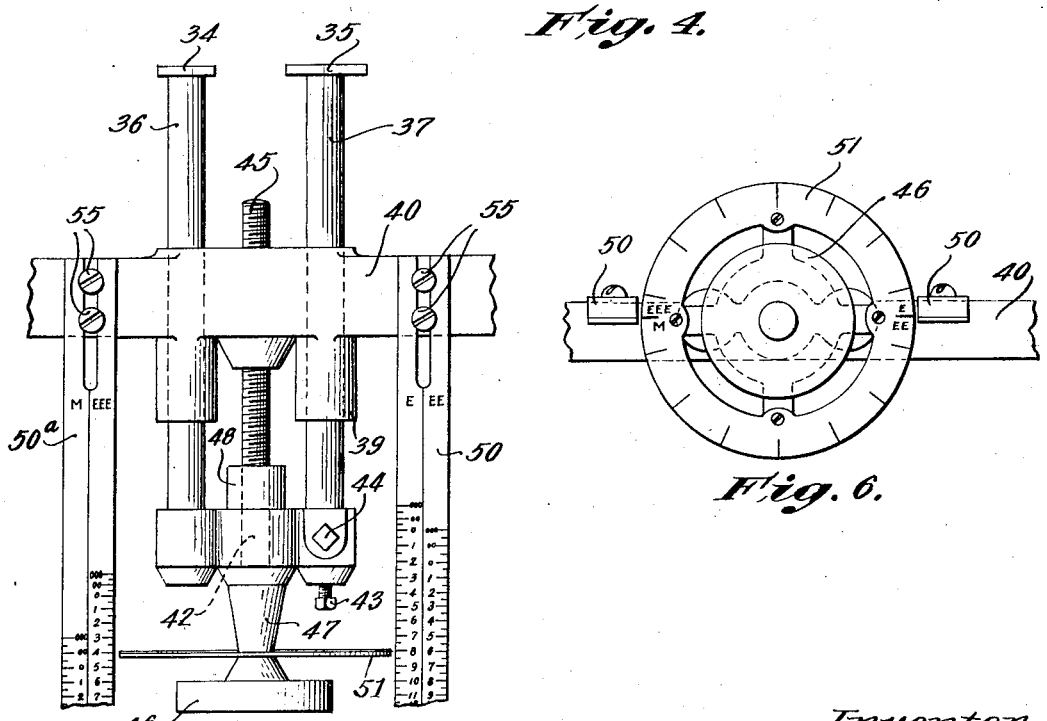
Inventor,
Thorndike D. Howe, Jr.,
by Roberts, Cushman & Woodbury
Attys.

Nov. 21, 1933.  T. D. HOWE, JR.  1,936,088
GAUGE FOR CUTTING MACHINES
Filed Sept. 8, 1932   3 Sheets-Sheet 3
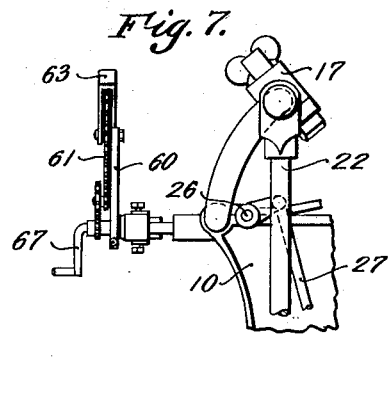
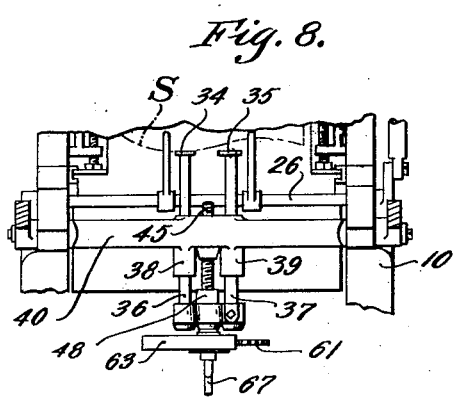
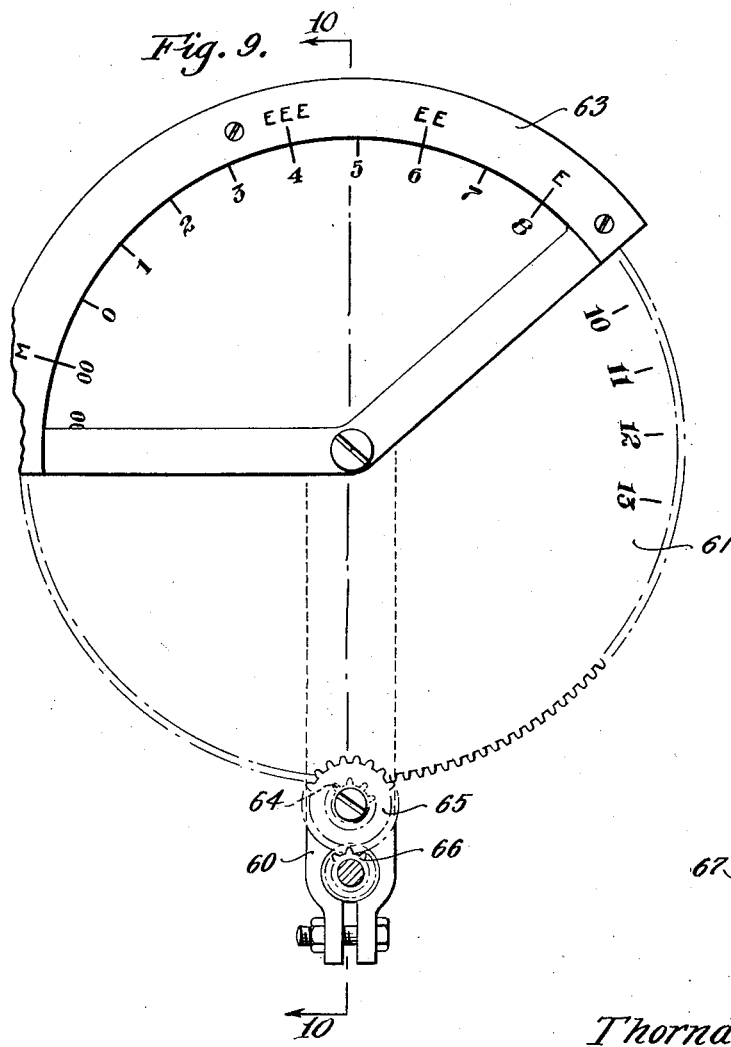
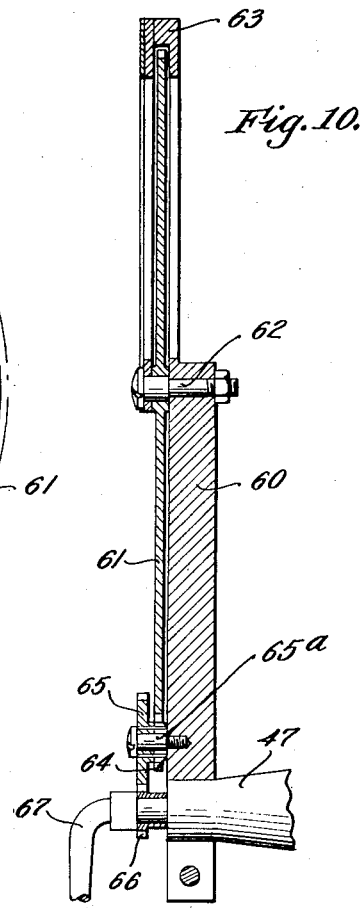
Inventor,
Thorndike D. Howe, Jr.,
by Roberts, Cushman & Woodbury
Attys.

Patented Nov. 21, 1933

1,936,088

UNITED STATES PATENT OFFICE 1,936,088

GAUGE FOR CUTTING MACHINES

Thorndike D. Howe, Jr., Boston, Mass., assignor to Solescope, Incorporated, Boston, Mass., a corporation of Massachusetts Application September 8, 1932. Serial No. 632,136

11 Claims. (Cl. 164—59)

This invention relates to a machine for use in cutting sheet material and its principal object is to enable the manufacturer to secure the maximum number of shapes, sizes or figures from a given piece of material while minimizing the amount of waste or scrap, and to make the necessary adjustments while still carrying on the cutting operation. In a more specific embodiment, the invention is concerned with a machine for cutting leather into suitable shapes and sizes for use as shoe parts, whereby the cutting operation may be carried out economically at substantially the usual speed, and without waste of the expensive material employed. As illustrative of the utility of this invention, I shall hereinafter describe it with particular reference to its applicability to the cutting of shoe soles from sole leather, but with the understanding that the invention is of broader utility.

In the manufacture of cut soles it is necessary to cut the material with as little waste as possible, since the raw material is so expensive, while waste or scrap is of comparatively little value. The pieces of raw material supplied to the manufacturer are of irregular contour, varying in lateral dimensions and thickness, and often contain defects which must be avoided, and in these and other respects present a difficult problem to the operator who is required to cut as many commercially acceptable soles as possible from each piece of material.

In the manufacture of the better grades of sole, only the firmest and most uniform portions of the hide are employed. Customarily each hide is split longitudinally of the backbone, thus forming two "sides" of leather. The head, belly and leg portions are trimmed away and the remainder of the side, known as a "back", is approximately ten feet long and about thirty inches wide, the back having a substantially straight edge along one side while the remaining marginal portion is of irregular contour. According to one method of preparing the cut soles, the back, or a selected portion thereof, is first stripped transversely by incisions perpendicular to the backbone line, and then each of these strips is cut or "chopped" up into shoe soles, the strip being of a breadth (measured parallel to the backbone line) which corresponds to the length (or size) of the sole which is to be cut therefrom.

For the greatest economy in the use of the material, the length of each strip, measured from the backbone line to the belly edge, should closely approximate an integral multiple of the width of the soles to be cut therefrom, but as the belly edge of the back or bend is irregular (so that the transverse width of the material varies), and as the width of the sole varies with its length or size, the economical cutting of the leather involves a complication of factors too intricate for the cutter or chopper to determine accurately merely by inspection, particularly when, as is common, it may be desired to cut the better part of a strip, that is, its backbone end, into soles of one width or grade, and the remainder of the strip into soles of another width or grade. Moreover, when different widths are to be cut from the same strip it is necessary for the operator, either to lay aside a partially cut strip till a more convenient time, or stop the cutting operation and readjust the machine for the proper size or width of the soles to be cut from the remainder of the strip.

In my copending application Serial No. 572,928, filed November 4, 1931, I have disclosed an apparatus by means of which the operator may quickly and accurately determine the number of soles of different commercial sizes which may be cut from a given side, so that a maximum number of integral soles of a given width or combination of widths can be cut from each individual strip. In accordance with the invention therein disclosed, the side is first stripped into transverse sections, each of a breadth which corresponds to the length of a shoe sole of a selected size and of a length (measured from the backbone line to the belly edge) which closely approximates the sum of the widths of a plurality of integral soles of a width or widths corresponding to the selected size. These strips are then marked to designate the number and width or combination of widths of soles to be cut therefrom.

The present invention provides a simple and efficient mechanism for quickly and accurately adjusting or resetting the stop members of a blocking or chopping machine in accordance with prearranged indicia operative to designate the position of the stop members relative to the cutter elements so that any desired width or combination of widths corresponding to a selected or predetermined pattern size may be accurately cut from a strip prepared in accordance with the aforementioned procedure, the adjusting mechanism being operative during the cutting operation and thus avoiding the necessity of stopping the machine in order to make the required adjustment.

In the drawings:

Figs. 3 and 4 are top plan views showing the adjusting mechanism and relative positions of the stop members and lateral guide;

Fig. 5 is an enlarged plan view of the adjusting mechanism and gauge elements;

Fig. 6 is an end elevation thereof;

Fig. 7 is a fragmentary side elevation of the adjusting mechanism embodying a modified form of gauge members;

Fig. 8 is a fragmentary plan view of the modification shown in Fig. 7;

Fig. 9 is an enlarged view of the cooperating scales of the gauge; and

Fig. 10 is a section on the line 10—10 of Fig. 9.

Figure 1:
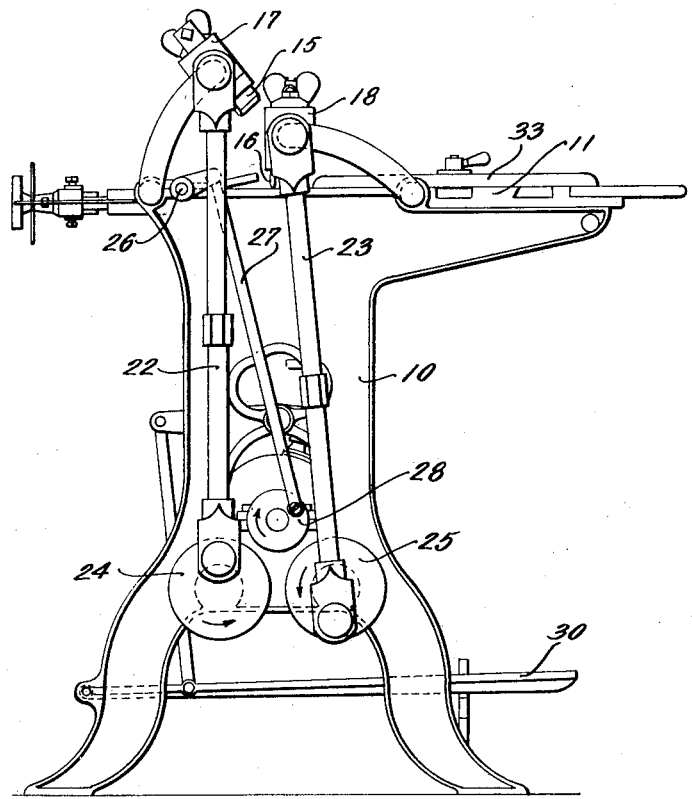
Fig. 1 is a side elevation of a blocking or chopping machine embodying one form of the present invention.
Figure 2:
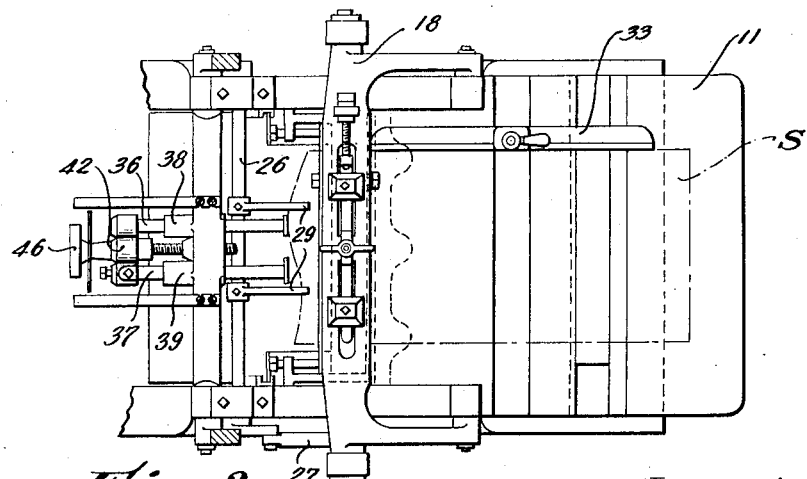
Fig. 2 is a top plan view thereof.

The invention is herein illustrated as applied to the well-known Knox type of chopping or blocking machine which comprises a frame 10 having a bed 11 for supporting a piece of leather or other sheet material S, and cutting elements including a cutting block disposed in the path of the knives 15 and 16 which are provided with reversely curved cutting edges adapted, by their conjoint action, to cut alternate right and left soles. The knives 15 and 16 are carried by suitable holders 17 and 18 respectively, which are pivotally connected to the frame 10 so that the center lines of the knives coincide. The knives are alternately reciprocated by connecting rods 22 and 23 which are pivotally attached at one end to the holders 17 and 18, and at their opposite ends to eccentrics or cranks 24 and 25 which are rotated at the same speed by a drive shaft and suitable gearing (not shown). A rock shaft 26 journaled in the frame 10 is oscillated at each actuation of the cutting knives by the connecting rod 27 which is driven by the crank 28 operated by suitable gearing (not shown). The rock shaft carries a pair of arms 29 which project over the forward edge of the sheet S and are oscillated by the rock shaft so as to knock each sole downwardly as soon as it is severed, thus preventing any interference with the feeding or cutting of the next sole. The operation of the machine is controlled by the treadle 30 which actuates both a brake and a clutch mechanism of any suitable type.

The bed of the machine is provided with a lateral guide 33 which is adjustable transversely thereof and cooperates with stop members 34 and 35 to insure the correct positioning of the sheet S relative to the path of the cutters. As shown in Figs. 3 and 4, the stops 34 and 35 are spaced and aligned so as to engage the salient curve portions of right and left soles, respectively, thus limiting the feeding movement of the sheet S toward the cutters.

The stops 34 and 35 are carried by slide bars 36 and 37, respectively, which are slidably mounted in guides 38 and 39 integral with the crossbar 40 which is rigidly secured to the frame 10. The opposite ends of bars 36 and 37 are disposed in openings in the yoke 42 which is provided with an adjusting screw 43 and a set screw 44, by means of which the relative positions of the bars 36 and 37 may be varied. A screw shaft 45 is journaled in the yoke 42 and engages a threaded aperture in crossbar 40 intermediate guides 38 and 39. The opposite end of the screw shaft 45 is provided with a hand wheel 46, and spaced collars 47 and 48 which engage opposite sides of the yoke 42 and cause the slide bars 36 and 37 and stops 34 and 35 to move simultaneously toward or away from the path of the cutters as the hand wheel 46 is rotated in one direction or the other.

In accordance with one illustrative embodiment of the present invention, a stationary gauge member, here shown as comprising an elongate scale 50, is disposed along the path of the slide bars 36 and 37 and in cooperative relation to a movable gauge member 51, here shown as a disk fixedly mounted on the screw shaft 45, intermediate the collar 47 and the hand wheel 46, and rotatable and longitudinally movable with both the hand wheel and screw shaft. The gauge member 50 may be clamped or otherwise secured in fixed position to a suitable support, such as the crossbar 40, and is preferably detachably secured thereto by any suitable means, such as screws 55, so as to permit interchangeability with other gauge members according to the particular pattern or style of sole to be cut. Likewise the scale on the gauge member 51 may be detachably secured thereto in a similar manner so as to permit interchangeability.

The scale on the gauge member 50 may be graduated in integrals of the difference in width between sets of patterns or different sizes of the same pattern, and lettered or figured in accordance with the custom of the leather trade, while the scale on the gauge member 51 may be graduated in multiples of the widths or pattern sizes corresponding to the graduations on the gauge scale 50 and similarly lettered and/or figured. The graduations on both scales are, of course, proportional to the pitch or feed of the screw shaft 45 and may vary in accordance with the particular pattern or style of the sole to be cut. In women's shoes, for example, standard length sizes vary by differences of 1/3 inch, while widths of such soles vary by differences of 1/16 inch, and a given sole width, for example, EE in a No. 6 sole does not correspond in actual measurement to that of an EE width in a No. 8 sole. Moreover men's sole sizes are different from women's sole sizes, while sole patterns vary with different manufacturers as to grade or length. Thus the width and length at least must be considered and treated as dependent variable factors in determined graduations of the scales on both gauge members. In order to adapt the adjusting mechanism and gauge members for use in cutting different ranges in widths and different pattern sizes, a plurality of sets of interchangeable scales may be provided, each set having indicia appropriate to the intended pattern or style.

In the particular embodiment shown in Figs. 5 and 6, the gauge member 50 is provided with a scale graduated in integrals of the difference in width between the different sizes of a given pattern, while the gauge member 51 is provided with a scale along its periphery graduated in multiples or fractions of integral widths corresponding to the same pattern, it being understood that the graduations may be designated by letters or numerals appropriate to the intended purpose. If desired, a second fixed gauge 50ª having graduations coordinated with those on the movable gauge 51 may be similarly mounted on the opposite side of the gauge 51 and cooperable therewith in a similar manner.

A complete revolution of the hand wheel 46 in either direction causes the stops 34 and 35 to travel toward or away from the path of the cutter a distance equal to the difference in width between consecutive integral sole sizes, or the distance between successive graduations on the scale of gauge member 50. Thus in order to set the stops for any designated sole width, it is merely necessary to bring the proper multiple width graduation on the gauge scale 51 into registry with the corresponding integral width graduation on the gauge scale 50.

The particular pattern shown in this embodiment consists of integral sizes designated by the numerals 000 to 13, and multiple or fractional sizes designated by the letters E, EE, EEE and M. Accordingly the gauge member 50 may be provided with two scales, one an E width and the other a EE width, and the gauge member 50ᵃ may likewise be provided with an EEE scale and an M scale. The disk gauge member 51 is graduated in multiple sizes corresponding to each of the scales on the gauge members 50 and 50ᵃ, as shown in Fig. 5. In this particular pattern an 8E width corresponds in actual size to a 6EE, a 4EEE, and an M00 width, and accordingly each of the scales are arranged, relative to the disk gauge member 51, so that the actual corresponding widths are simultaneously indicated by the gauge members 50, 50ᵃ and 51.

When a single sole width is to be chopped from a given strip prepared in accordance with the invention set forth in my copending application, Serial No. 572,928, filed November 4, 1931, the operator needs only to make the initial setting, and as the strip is an integral multiple of such width, it is only necessary to feed the strip to the machine in the usual manner to cut it to the best advantage. When, however, the leather has been stripped to produce a combination of sole widths, the stops are first set to correspond with one of the specified widths and the specified number of soles are chopped out in the usual manner, whereupon the stops are then quickly readjusted to a second position merely by manipulating the hand wheel 46 to bring the proper graduation of gauge scale 51 into registry with the proper graduation of gauge scale 50. Thus a quick and accurate resetting of the stops during the cutting operation may be made and soles having two or more different widths may be cut from the same strip of leather without, as was previously necessary, laying aside the half-cut strip and either stopping the machine to make the necessary readjustment, or coming back later to the remnant which has been laid aside until the stops had been reset for the desired width.

In the second embodiment of the invention shown in Figs. 7 to 10, the adjusting mechanism is substantially the same as that shown in the previously described embodiment and the corresponding elements have the same reference characters applied thereto. However the gauge device constitutes a detachable unit, comprising a bracket 60 which is clamped or otherwise detachably secured in fixed position to the collar 47 above described (the part 51 being omitted)—a rotatable disk gauge member 61 mounted on a stub shaft 62 carried by bracket 60, and a fixed gauge 63, here shown as comprising a semi-circular rimmed member integrally joined to bracket 60 and encircling the upper peripheral portion of the rotatable gauge member 61, as shown in Fig. 10. The periphery of disk 61 is toothed and engages a pinion 64 fixed to an idler gear 65 mounted on a stub shaft 65ᵃ carried by bracket 60, said gear 65 being driven by a gear 66 pinned or otherwise secured to the end of screw shaft 45.

In place of the hand wheel 46 shown in the previously described embodiment, a crank 67 is pinned or otherwise secured to the end of a shaft 45.

The disk gauge 61 is provided with a scale along its periphery, graduated in integrals of the difference in width between consecutive pattern sizes, and the scale of gauge 63 is graduated in multiples of the integral widths corresponding to the same pattern, the graduations of both scales cooperating to indicate the exact position of the stops relative to the path of the cutters to produce a sole whose width corresponds to the indicated pattern size. Preferably the scale or gauge member 63 is detachably secured thereto so as to permit interchangeability with other scales adapted to be used with the scale or gauge 61.

The gear ratio and the pitch of the screw shaft is such that the travel of the stops toward or away from the path of the cutter conforms to the difference in width between integral or multiple widths, as indicated by the graduations of both scales. The pattern shown in this particular embodiment is the same as that shown in the previously described embodiment. The scale 61 is graduated in integral widths from 000 to 13, and the fixed scale is graduated in multiples thereof designated by the letters E, EE, etc. It will be noted that when the graduation 8 registers with the graduation E the stops are then set for an 8E width; also a 6EE, 4EEE and an M00 width, all of which, as previously noted, correspond in actual width to a number 8E in this particular pattern. In order to change from one width size to another, it is merely necessary to rotate the crank to bring the specified integral width graduation on the movable scale into registry with the proper multiple width graduation on the fixed scale.

As previously noted, both the fixed and movable gauge members constitute a unit which may be easily detached and interchanged with any of a plurality of similar units having the same construction, each of which may be graduated to conform with a different range of the same pattern, or a different pattern style entirely, it being understood that the invention is not limited to the particular indicia on the gauge members. By reason of the interchangeable character of the gauge members the change from one pattern to another is greatly simplified and the time necessary to make such a change is greatly reduced.

From the foregoing it is evident that the apparatus embodying my invention provides for the accurate and economical cutting of leather in commercial quantities and at commercial speeds into soles of requisite size and grade with an appreciable saving in time and handling of material, and with a minimum amount of waste.

While I have shown and described certain desirable embodiments, it is to be understood that the present disclosure is for the purpose of illustration only and that various changes in shape, proportion and arrangements of parts, as well as substitution of equivalent elements for those herein shown and described, may be made without departing from the spirit and scope of the invention as set forth in the appended claims.

I claim:

1. In a sole blocking machine of the character described having a cutter block and a cutter movable in a fixed path toward and away from the cutter block, the combination of an adjustable stop spaced from the path of said cutter a distance equal to the width of the sole to be cut, mechanism for moving said stop toward or away from the path of said cutter, and means comprising a fixed scale and a movable scale associated with said mechanism and cooperating with the fixed scale for designating the position of said stop relative to the path of said cutter to produce a sole whose width corresponds to a predetermined pattern.

2. In a sole blocking machine of the character described having a cutter block and a cutter movable in a fixed path toward and away from the cutter block, the combination of an adjustable stop spaced from the path of said cutter a distance equal to the width of the sole to be cut, mechanism for moving said stop toward or away from the path of said cutter, and means comprising cooperating scales for designating the position of said stop relative to the path of said cutter to produce a sole whose width corresponds to a predetermined pattern, one of said scales being calibrated in integral pattern widths and the other scale being calibrated in multiple widths corresponding thereto.

3. In a sole blocking machine of the character described having a cutter block and a cutter movable in a fixed path toward and away from the cutter block, the combination of an adjustable stop spaced from the path of said cutter a distance equal to the width of the sole to be cut, mechanism for moving said stop toward or away from the path of said cutter, and means comprising a fixed scale cooperating with a movable scale for designating the position of said stop relative to the path of said cutter to produce a sole whose width corresponds to a predetermined pattern size, said fixed scale being calibrated in pattern sizes, and said movable scale being calibrated in sole widths corresponding to the pattern sizes.

4. In a sole blocking machine of the character described having a movable stop spaced from the path of the cutting elements a distance equal to the width of the sole to be cut, the combination with an adjusting mechanism comprising a fixed guide and a slidable member mounted in said guide and supporting said stop for movement toward and away from the path of said cutter elements, of a fixed scale mounted adjacent to the path of movement of said slidable member, and a movable scale associated with said slidable member and cooperable with said fixed scale to designate the position of said stop to produce a sole whose width corresponds to a predetermined pattern size.

5. In a sole blocking machine of the character described having a movable stop spaced from the path of the cutting elements a distance equal to the width of the sole to be cut, the combination with an adjusting mechanism comprising guiding means and a movable member mounted in said guiding means and supporting said stop for movement toward and away from the path of said cutting elements, of means operative to designate the position of said stop relative to the path of said cutting elements to produce a sole whose width corresponds to a predetermined pattern size, said means comprising relatively movable scales associated with said movable member, one of said scales being calibrated in integral pattern sizes, and the other in multiple sizes corresponding thereto.

6. In a sole blocking machine of the character described having a movable stop spaced from the path of the cutting elements a distance equal to the width of the sole to be cut, the combination with an adjusting mechanism comprising a guide, and a member mounted in said guide and supporting said stop for movement toward and away from the path of said cutting elements, of relatively movable scales associated with said adjusting mechanism, one of the scales being calibrated in integral pattern sizes and the other in multiples corresponding to the pattern sizes, said scales being operative to designate the position of said stop relative to the path of said cutting elements to produce a sole whose width corresponds to selected pattern size.

7. In a sole blocking machine of the type having a movable stop spaced from the path of the cutting elements a distance equal to the width of the sole to be cut, the combination of an adjusting mechanism including a guide, a slide bar mounted in said guide and supporting said stop for movement toward and away from the path of said cutting elements, and a screw shaft for moving said slide bar toward and away from said cutting elements, of relatively movable gauge members having cooperating scales graduated in integral and multiple widths of a selected pattern, said gauge members being actuated in response to movement of said slide bar and operative to designate the position of said stop relative to the path of said cutting elements, whereby a sole having a width corresponding to any of a plurality of widths within the range of said scales may be accurately cut from a sheet of stock.

8. In a sole blocking machine of the type having a movable stop spaced from the path of the cutting elements a distance equal to the width of the sole to be cut, the combination of an adjusting mechanism including a guide, a slide bar mounted in said guide and supporting said stop for movement toward and away from the path of said cutting elements, and a screw shaft for moving said slide bar toward and away from said cutting elements, of relatively movable gauge members comprising a fixed scale and a movable scale disposed in cooperative relation thereto, said scales being graduated in integral and multiple widths corresponding to a selected pattern and operative to designate the position of said stop relative to the path of said cutting elements, whereby a sole having a width corresponding to any of a plurality of widths within the range of said scales may be accurately cut from a sheet of stock.

9. In a sole blocking machine of the type having a movable stop spaced from the path of the cutting elements a distance equal to the width of the sole to be cut, the combination of an adjusting mechanism including a guide, a slide bar mounted in said guide and supporting said stop for movement toward and away from the path of said cutting elements, and a screw shaft for moving said slide bar toward and away from said cutting elements, of cooperating gauge members operative to designate the position of said stop relative to the path of said cutting elements, said gauge members comprising a fixed scale mounted adjacent to said slide bar and graduated in integral widths corresponding to a selected pattern, and a movable scale mounted in said screw shaft and graduated in multiple widths corresponding to said pattern.

10. In a sole blocking machine of the type having a movable stop spaced from the path of the cutting elements a distance equal to the width of the sole to be cut, the combination of an adjusting mechanism including a guide, a slide bar mounted in said guide and supporting said stop for movement toward and away from the path of said cutting elements, and a screw shaft for moving said slide bar toward and away from said cutting elements, of a fixed gauge member having an elongate scale disposed adjacent to said slide bar and graduated in integral widths corresponding to a selected pattern, and a movable gauge member comprising a disk mounted on said screw shaft in cooperative relation to said fixed gauge member and having a scale along its periphery graduated in multiple widths corresponding to said pattern.

11. In a sole blocking machine of the type having a movable stop spaced from the path of the cutting elements a distance equal to the width of the sole to be cut, the combination of an adjusting mechanism including a guide, a slide bar mounted in said guide and supporting said stop for movement toward and away from the path of said cutting elements, and a screw shaft for moving said slide bar toward and away from said cutting elements, of cooperating gauge members operative to designate the position of said stop relative to the path of cutting elements, one of said gauge members comprising a disk rotatable by said screw shaft, said disk being graduated along its periphery in integral widths corresponding to a selected pattern, the other of said gauge members comprising an arcuate element disposed in fixed concentric relation to said disk and graduated along its periphery in multiple widths corresponding to said pattern.

THORNDIKE D. HOWE, Jr.